Patented July 6, 1937

2,085,768

UNITED STATES PATENT OFFICE 2,085,768

METHOD OF SEPARATING AND ISOLATING THE THYREOTROPIC AND THE GONADOTROPIC HORMONE OF THE ANTERIOR LOBE OF THE HYPOPHYSIS

Walter Schoeller, Berlin-Westend, and Karl Junkmann, Berlin, Germany, assignors to Schering-Kahlbaum A. G., Berlin, Germany No Drawing. Application June 21, 1934, Serial No. 731,644. In Germany June 22, 1933

9 Claims. (Cl. 167—74)

This invention relates to hormones, and more particularly to those contained in the interior lobe of the pituitary gland and has for one of its objects to provide a process whereby two of these hormones can be recovered separately with particular ease.

According to the process described and claimed in our copending application, Serial Number 638,344, filed on October 18, 1932, of which this application is a continuation in part, it is possible to separate the thyreotropic hormone from the gonadotropic hormone of the anterior lobe of the pituitary gland and to recover both these hormones separately, if watery extracts or press juices of the pituitary gland, which have been produced at ordinary temperature and with any desired hydrogen ion concentration, are treated with an agent capable of precipitating albumen, the precipitate thus obtained being freed from the precipitating agent and the waste liquors from these precipitations being treated for the recovery of the gonadotropic hormone.

The precipitate freed from the precipitating agent contains the thyreotropic hormone, which can be purified by repeating the precipitation with an agent for precipitating albumen and again freeing the precipitate from such agent.

Now we have found that it is of great advantage to use as agents for precipitating albumen, compounds of strongly acid nature, i. e. those the pH value of which is lower than 3. Such compounds are, for instance, picric acid, sulfosalicylic acid, trichloro acetic acid and the like, to purify the precipitate by dissolving the same in an amount of ammonia or alkali hydroxide sufficient to just cause dissolution, and to cause precipitation by adding ten to twenty times its amount of acetone, or a mixture of alcohol and ether, or any other solvent capable of dissolving lipoids. This procedure makes it possible to obtain more rapidly and with a much better yield than according to the process of the above mentioned copending application, products which give clear solutions in very dilute acids.

In practising our invention, we may, for instance proceed as follows:—

Example 1

1 kilogram of fresh ground anterior lobes of the pituitary gland are shaken for 12 hours with 250 grams of kieselguhr and 15 liters of a 2% sodium bicarbonate solution, whereupon the mixture is filtered by suction. An equal quantity of aqueous picric acid solution is added to the clear filtrate, the precipitate is separated and suspended in 1 liter of water. To the aqueous suspension such an amount of concentrated ammonia is added that the precipitate is dissolved. After filtration from impurities, the solution is precipitated by the addition of 20 liters of acetone, whereupon the precipitate is filtered off rapidly and is washed first with acetone and then with ether until the washing ether remains colorless.

40 grams of a white powder are obtained, said product being readily soluble in dilute acids and containing about 10 to 15 guinea pig units per milligram.

From the mother liquors the gonadotropic hormone can be obtained by concentrating these liquors in vacuo at very low temperature, removing the picric acid in a well known manner and recovering the gonadotropic hormone by salting out.

Example 2

1 kilogram of fresh ground anterior lobes of the pituitary gland is treated as described in Example 1. The ammoniacal solution of the precipitate obtained by the action of picric acid on the bicarbonate solution, is precipitated by the addition of 20 liters of a mixture of 1 part of alcohol and 4 parts of ether. The precipitate is worked up in the same manner as described in Example 1. The yield of the thyreotropic hormone is about the same.

Example 3

1 kilogram of fresh ground anterior lobes of the pituitary gland is treated as described in Example 1, except that instead of precipitating the thyreotropic hormone by means of picric acid, a solution of sulfo salicylic acid is used as precipitating agent. The purification of the precipitate obtained thereby is carried out in the same manner as described in Example 1 or 2. The yield of the thyreotropic hormone is about the same.

Instead of picric and sulfo salicylic acid, other acids having a pH of less than 3, may be used, such as for instance trichloroacetic acid, picrolonic acid, and the like.

As starting material may be used either extracts or press juices of fresh pituitary glands. The most suitable material, however, are dry powdered anterior lobes of the pituitary gland, which have been dried at low temperature and freed from fat by means of suitable solvents.

Various other changes may be made in the process claimed by those skilled in the art in accordance with the principles set forth herein and in the claims annexed hereto.

What we claim is:

1. A method of recovering the thyreotropic hormone of the anterior lobe of the pituitary gland in which the precipitate obtained by subjecting an aqueous extract or preparation, prepared at ordinary temperature from the anterior lobe of the hypophysis, to conditions conducive to albumen precipitation, is separated from precipitating agent, said method comprising dissolving said precipitate in an alkaline solution, adding to said alkaline solution a large amount of a solvent capable of dissolving lipoids, and separating the precipitate obtained thereby.

2. A method of recovering the thyreotropic hormone of the anterior lobe of the pituitary gland, comprising acting on a watery preparation produced at ordinary temperature from the anterior lobes of pituitary glands with an agent capable of precipitating albumen and having a pH-value not exceeding 3, dissolving said precipitate in an alkaline solution, adding to said alkaline solution a large amount of a solvent capable of dissolving lipoids, and separating the precipitate obtained thereby.

3. A method of recovering the thyreotropic hormone of the anterior lobe of the pituitary gland, comprising acting on a watery preparation produced at ordinary temperature from the anterior lobes of pituitary glands with an agent capable of precipitating albumen and having a pH-value not exceeding 3, dissolving said precipitate in an alkaline solution, adding a large amount of acetone to said solution, and separating the precipitate obtained thereby.

4. A method of recovering the thyreotropic hormone of the anterior lobe of the pituitary gland, comprising acting on a watery preparation produced at ordinary temperature from the anterior lobes of pituitary glands with an agent capable of precipitating albumen and having a pH-value not exceeding 3, dissolving said precipitate in an alkaline solution, adding a large amount of a mixture of alcohol and ether to said solution, and separating the precipitate obtained thereby.

5. A method of recovering the thyreotropic hormone of the anterior lobe of the pituitary gland, comprising acting on a watery preparation produced at ordinary temperature from the anterior lobes of pituitary glands with an agent capable of precipitating albumen and having a pH-value not exceeding 3, separating the precipitate from the adhering precipitating agent, taking the precipitate up with water and repeating the precipitation with an acid albumen-precipitating agent having a pH-value not exceeding 3, dissolving the precipitate obtained in an alkaline solution, adding to said alkaline solution a large amount of a solvent capable of dissolving lipoids, and separating the precipitate obtained thereby.

6. A method of recovering the thyreotropic hormone of the anterior lobe of the pituitary gland, comprising acting on a watery preparation produced at ordinary temperature from the anterior lobes of pituitary glands with an agent capable of precipitating albumen and having a pH-value not exceeding 3, separating the precipitate from the adhering precipitating agent, taking the precipitate up with water and repeating the precipitation with an acid albumen-precipitating agent having a pH-value not exceeding 3, dissolving the precipitate obtained in an alkaline solution, adding a large amount of acetone to said solution, and separating the precipitate obtained thereby.

7. The method of separately recovering the thyreotropic and the gonadotropic hormone of the anterior lobe of the pituitary gland, comprising acting on a watery preparation produced at ordinary temperature from the anterior lobes of pituitary glands with an acid of the group of acids constituted by picric acid, picrolonic acid, sulfo salicylic acid and trichloro acetic acid for the precipitation of albuminous matter, separating the precipitate, dissolving said precipitate in an alkaline solution, adding to said alkaline solution a large amount of a solvent capable of dissolving lipoids, and separating the precipitate obtained thereby and treating the residual mother liquors for the separation of the gonadotropic hormone.

8. A substance possessing the hereindescribed physiological characteristics of the thyreotropic hormone derived from a precipitate of the albuminous components of an extract of the anterior lobe of the pituitary gland substantially free from the gonadotropic hormone and lipoids, insoluble in picric acid and in acetone, soluble in dilute acids and having an efficiency of about ten guinea pig units or more per milligram and obtained in accordance with the process of claim 1.

9. A thyreotropic hormone substance having an efficiency of at least about ten guinea pig units per milligram and obtained in accordance with the process of claim 2.

WALTER SCHOELLER.
KARL JUNKMANN.